US008897575B2

(12) United States Patent
Ding et al.

(10) Patent No.: US 8,897,575 B2
(45) Date of Patent: Nov. 25, 2014

(54) MULTI-SCALE, PERSPECTIVE CONTEXT, AND CASCADE FEATURES FOR OBJECT DETECTION

(75) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 13/350,375

(22) Filed: Jan. 13, 2012

(65) Prior Publication Data
US 2012/0219210 A1 Aug. 30, 2012

Related U.S. Application Data

(60) Provisional application No. 61/447,570, filed on Feb. 28, 2011.

(51) Int. Cl.
G06K 9/56 (2006.01)
G06K 9/46 (2006.01)
G06K 9/66 (2006.01)
G06K 9/52 (2006.01)

(52) U.S. Cl.
CPC .............. *G06K 9/4671* (2013.01); *G06K 9/527* (2013.01); *G06K 9/4642* (2013.01)
USPC ............................ 382/205; 382/195; 382/190

(58) Field of Classification Search
None
See application file for complete search history.

(56) References Cited

U.S. PATENT DOCUMENTS

| | | | |
|---|---|---|---|
| 7,171,047 B2* | 1/2007 | Grinchuk et al. | 382/199 |
| 7,194,114 B2* | 3/2007 | Schneiderman | 382/118 |
| 7,382,897 B2 | 6/2008 | Brown et al. | |
| 7,783,086 B2* | 8/2010 | Sabe et al. | 382/118 |
| 7,835,541 B2* | 11/2010 | Lee et al. | 382/103 |
| 8,538,081 B2* | 9/2013 | Ding et al. | 382/103 |
| 8,687,892 B2* | 4/2014 | Demoulin et al. | 382/192 |
| 8,731,306 B2* | 5/2014 | Chertok et al. | 382/201 |
| 8,737,726 B2* | 5/2014 | Yamaguchi | 382/164 |
| 2004/0179719 A1* | 9/2004 | Chen et al. | 382/118 |
| 2008/0292192 A1* | 11/2008 | Seki | 382/199 |
| 2008/0304714 A1* | 12/2008 | Lu et al. | 382/118 |
| 2010/0040285 A1 | 2/2010 | Csurka et al. | |
| 2010/0128993 A1* | 5/2010 | Sebe et al. | 382/224 |
| 2011/0299770 A1* | 12/2011 | Vaddadi et al. | 382/165 |
| 2012/0219211 A1* | 8/2012 | Ding et al. | 382/159 |

OTHER PUBLICATIONS

Ding, Yuanyuan, and Jing Xiao. "Contextual boost for pedestrian detection." Computer Vision and Pattern Recognition (CVPR), 2012 IEEE Conference on. IEEE, 2012.*

Dalal, Navneet, and Bill Triggs. "Histograms of oriented gradients for human detection." Computer Vision and Pattern Recognition, 2005. CVPR 2005. IEEE Computer Society Conference on. vol. 1. IEEE, 2005.*

(Continued)

*Primary Examiner* — Stephen R Koziol
*Assistant Examiner* — Sean Conner

(57) ABSTRACT

Systems and methods for object detection are presented herein. Embodiments of the present invention utilizing a cascade feature, one or more features at different scales, one or more multi-scale features in combination with a perspective feature, or combinations thereof to detect an object of interest in an input image. In embodiments, the various features are used to train classifiers. In embodiments, the trained classifiers are used in detecting an object of interest in one or more input images.

15 Claims, 16 Drawing Sheets

(56) References Cited

OTHER PUBLICATIONS

Ramanan, Deva. "Using segmentation to verify object hypotheses." Computer Vision and Pattern Recognition, 2007. CVPR'07. IEEE Conference on. IEEE, 2007.*

Park, Dennis, Deva Ramanan, and Charless Fowlkes. "Multiresolution models for object detection." Computer Vision—ECCV 2010. Springer Berlin Heidelberg, 2010. 241-254.*

Avidan, Shai. "Spatialboost: Adding spatial reasoning to adaboost." Computer Vision-ECCV 2006. Springer Berlin Heidelberg, 2006. 386-396.*

Torralba, Antonio, Kevin P. Murphy, and William T. Freeman. "Contextual Models for Object Detection Using Boosted Random Fields." NIPs. vol. 1. 2004.*

Wolf, Lior, and Stanley Bileschi. "A critical view of context." International Journal of Computer Vision 69.2 (2006): 251-261.*

Heitz, Geremy, and Daphne Koller. "Learning spatial context: Using stuff to find things." Computer Vision-ECCV 2008. Springer Berlin Heidelberg, 2008. 30-43.*

Divvala, Santosh Kumar, et al. "An empirical study of context in object detection." Computer Vision and Pattern Recognition, 2009. CVPR 2009. IEEE Conference on. IEEE, 2009.*

Torralba, Antonio, Kevin P. Murphy, and William T. Freeman. "Using the forest to see the trees: exploiting context for visual object detection and localization." Communications of the ACM 53.3 (2010): 107-114.*

Tu, Zhuowen. "Auto-context and its application to high-level vision tasks." Computer Vision and Pattern Recognition, 2008. CVPR 2008. IEEE Conference on. IEEE, 2008.*

Tang, S., et al., "Multiscale Block Histogram of Template Feature for Pedestrian Detection", Proceedings of 2010 IEEE 17th International Conference on Image Processing, Sep. 26-29, 2010.

Laptev, I., "Improving object detection with boosted histograms", Elsevier, Jun. 9, 2008.

Ye, Q., et al., "Multi-posture human detection in video frames by motion contour matching", Proceeding ACCV'07 Proceedings of the 8th Asian conference on Computer vision, 2007.

Luo, Q., et al., "Human action detection via boosted local motion histograms", Machine Vision and Applications, vol. 21, No. 3, pp. 377-389, Springer, 2010.

Ye, Q., et al., "Fast Pedestrian Detection with Multi-Scale Orientation Features and Two-Stage Classifiers" Proceedings of 2010 IEEE 17th International Conference on Image Processing, Sep. 26-29, 2010.

* cited by examiner

200

Obtain an image patch (A) from an input image
(215)

Resize to a normalized high-resolution size (e.g., 64 x 128 pixels)
(220)

Compute high-resolution feature for the normalized image patch (e.g., histogram of gradient (HoG) feature)
(225)

High-Resolution Feature Generation

1000

Scale-Adaptive Object Detection

| Window-scale | 12*24 | 16*32 | 36*72 | Scale-adaptive |
|---|---|---|---|---|
| Precision | 1.5556% | 4.2481% | 3.4941% | 3.15268% |
| Recall | 93.950% | 96.234% | 96.914% | 98.3479% |
| Running Time | ~25min | ~45min | ~5hr | ~2hr |

FIGURE 10

MULTI-SCALE, PERSPECTIVE CONTEXT, AND CASCADE FEATURES FOR OBJECT DETECTION

CROSS-REFERENCE TO RELATED APPLICATION

This application claims the priority benefit under 35 USC §119(e) to commonly assigned U.S. Patent Application No. 61/447,570, filed on Feb. 28, 2011, entitled "CONTEXTUAL BOOST FOR PEDESTRIAN DETECTION", and listing as inventors Yuanyuan Ding and Jing Xiao. The aforementioned patent document is incorporated by reference herein in its entirety.

BACKGROUND

1. Field of Invention

The present patent document is directed towards systems and methods for object detection. More particularly, the present patent document is directed towards systems and methods for generating and using object detection models.

2. Description of the Related Art

Object detection from images can be important to many applications, such as surveillance, robotics, manufacturing, security, medicine, and automotive safety—just to name a few areas of application. However, object detection is among the most challenging vision tasks due in part to the great variety in appearance and shape of objects, highly cluttered environments, and often low resolution and low quality image sources.

Predominant approaches for object detection usually involve scanning an input image with sliding windows to identify the locations of image patches that may contain the object of interest. To determine whether a local window includes the object of interest, both generative and discriminative approaches have been developed. The generative approaches typically infer the posterior probability for the object class using discrete or continuous shape models, or combining shape and texture models. The discriminative approaches extract image features in the local window and construct classifiers for detection. For this purpose, various features have been proposed, such as Haar wavelet features, gradient-based features, shape-based features, combination of multiple features, automatically mined features, or pose-invariant features. The local features are then used to identify the object of interest in a classification process by algorithms such as AdaBoost or support vector machine (SVM).

It must be noted, however, that these methods generally only utilize information inside an image patch region. That is, these detection methods seek to detect the object without taking into account the context. Furthermore, these prior approaches do not adequately consider that objects at different sizes have qualitatively very different appearances.

Accordingly, systems and methods are needed that can address the challenges presented when trying to detect an object or item in an image.

SUMMARY OF INVENTION

The present invention includes systems and methods for generating detection models that consider contextual information of an image patch and for using detection models that consider contextual information. Detection of humans may be used herein for purposes of illustration, but it shall not limit application of the present invention; one skilled in the art shall recognize that the present disclosure may be used or adapted for use in detecting other objects of interest.

Systems and methods for object detection are presented herein. Embodiments of the present invention utilizing one or more features at different scales, one or more multi-scale features in combination with a perspective feature, cascade features, or combinations thereof to detect an object of interest in an input image. In embodiments, the multi-scale, perspective, cascade features, and/or combinations thereof are used to train detection classifiers. In embodiments, the trained classifiers are used in detecting an object of interest in one or more input images.

In embodiments, a high-scale feature comprises one or more features extracted from an image patch at a high-resolution size.

In embodiments, a mid-scale feature comprises a combination of one or more features extracted from an image patch at a mid-resolution size and one or more features extracted from a set of one or more regions at the mid-resolution size that are formed from the context region of the image patch.

In embodiments, a low-scale feature comprises one or more features extracted from a combined image patch at a low-resolution size, wherein the combined image patch comprises the image patch and the context region.

In embodiments, a perspective context feature comprises a feature related to the image patch size, a feature related to the image patch position within the image, or both.

In embodiments, a cascade feature or features may be generated using features from an image patch and its context region or regions. In embodiments, the cascade feature may be used in systems and methods as a subsequent classifier stage to improve detection rates.

Embodiments of the present invention include systems for training one or more classifiers related to the features described herein and systems for using one or more trained classifiers for object detection. In embodiments, systems may comprise both training and detecting capabilities.

Embodiments of the present invention include methods that have been encoded upon one or more non-transitory computer-readable media with instructions for one or more processors or processing units to perform. A method may include a plurality of instructions that are executed by one or more processors.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIG. 10 depicts some sample object detection results according to embodiments of the present invention.

DESCRIPTION OF THE PREFERRED EMBODIMENTS

Figure 1:
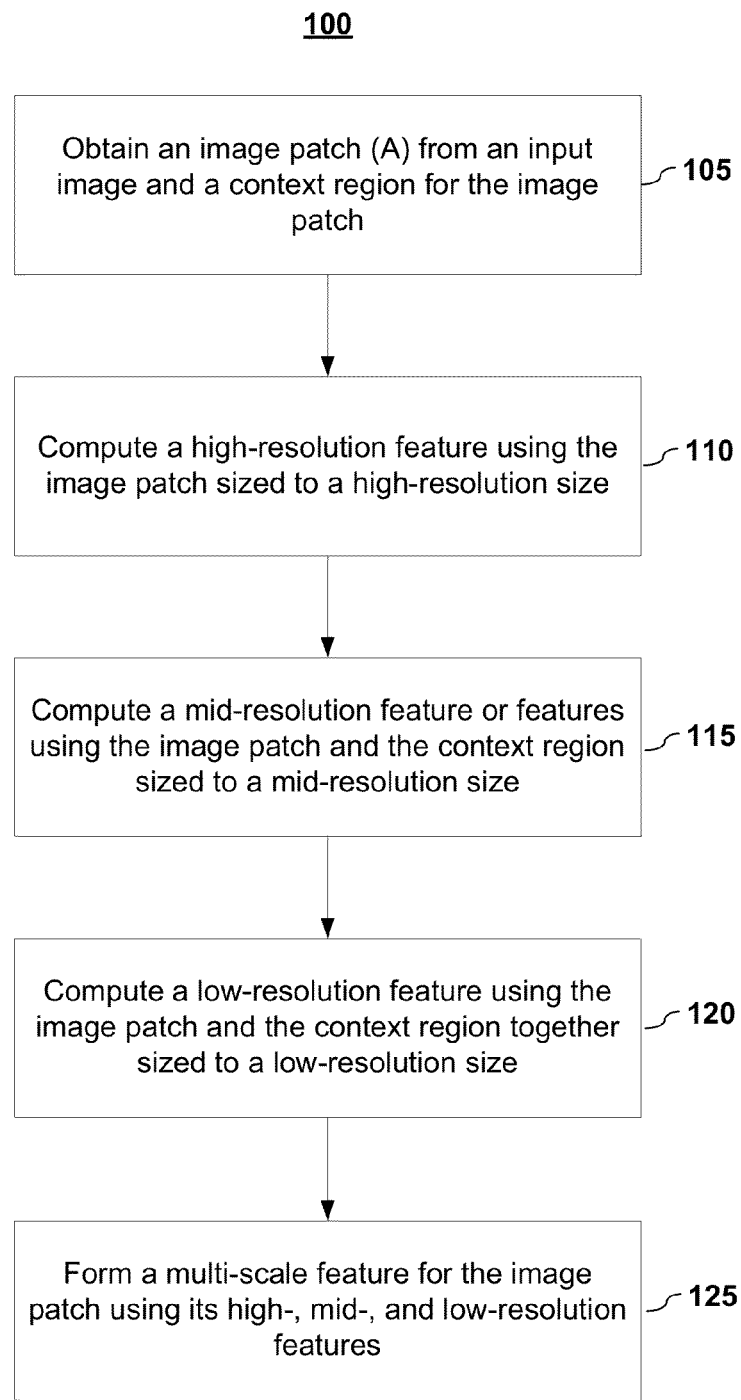
FIG. 1 depicts a multi-scale methodology according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. It shall be noted that the use of the term "set" in this patent document shall include any number of items.

BACKGROUND

When attempting to detect an object in an image, it is important to consider factors that aid in improving the ability to detect the object. Both the scale of an object of interest and its contextual information are significant factors to consider in object detection. Traditionally, like objects were treated or modeled in a like manner. While such approaches appear logical, they fail to consider that objects at different sizes can have qualitatively very different appearances. Thus, systems and methods of object detection can have better detection rates by modeling or representing like objects of different size or resolution differently. Furthermore, context information, such as pixel location, object height, width, etc., also provides important features that can aid object detection.

As previously noted, prior methods for detecting objects within an image using classifiers were limited because these methods did not adequately consider contextual information and to account for various scales of objects. The present patent document provides embodiments of multi-resolution feature descriptors that may also be combined with context feature descriptors to improve object detection, such (by way of example and not limitation) human detection. In embodiments, multi-resolution feature descriptors, context feature descriptors, and both may be used in training detection systems and in detection systems.

Multi-Scale Feature(s)

FIG. 1 depicts a multi-scale methodology according to embodiments of the present invention. As illustrated in FIG. 1, in embodiments, an image patch along with context region is obtained (110) from an input image. In the current patent document, systems and methods shall be described in terms of an image patch from an input image, but one skilled in the art shall recognize that the systems and methods may be applied to a plurality of image patches from an image or images. In embodiments, the image patch may be obtained from a scan window image patch. The scan window image patch may be obtained from applying an existing detector, such as AdaBoost or SVM, to an input image or images to obtain one or more scan window image patches. In embodiments, the initial scan window image patch is expanded to double by including a context region. For example, the length (l) and width (w) of the initial scan window may each be doubled so that the context region, with the initial image patch centered within the context region, has dimensions of 2l×2w. In embodiments, if the initial image scan is at or near an edge of the image so that a full context region cannot be formed from original image pixels, pixels may be added to the missing region or regions. In embodiments, the missing pixels may be black, white, have the same average brightness as a local region, may be an extension of a line or portion of pixel values at an edge of the missing region, may be filled with some portion of the image, one or more values computed from the image or a portion thereof, some combination thereof, or may have some other configuration. It shall be noted that other context region sizes, shapes, and configurations may be used, including having no additional context region in one or more context region portions or directions.

Figure 2:
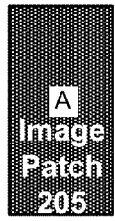
FIG. 2 presents a method for forming a high-resolution, or high-scale, feature according to embodiments of the present invention.
Figure 2:
Figure 2:
Figure 3:
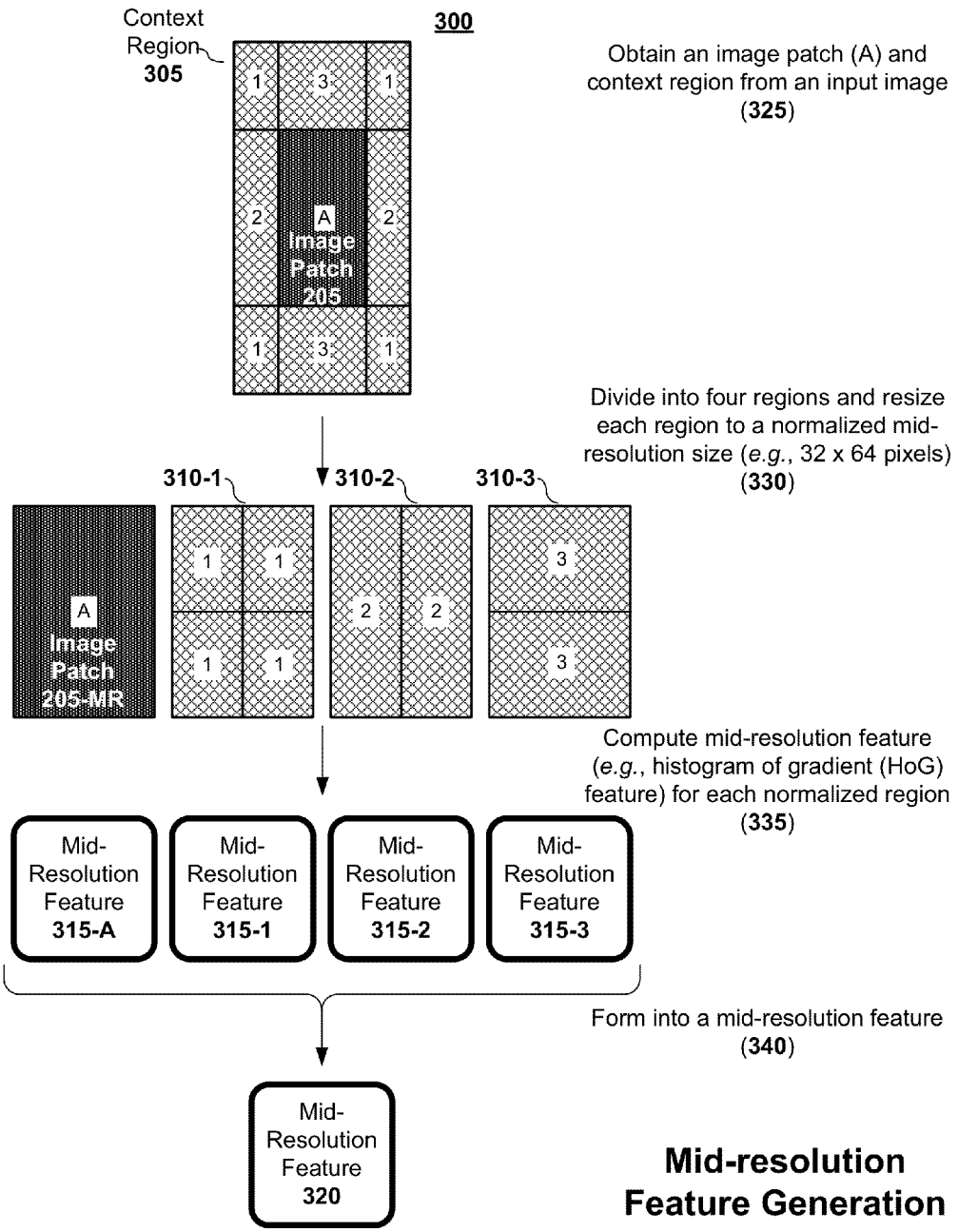
FIG. 3 presents a method for forming a mid-resolution, or mid-scale, feature according to embodiments of the present invention.
Figure 4:
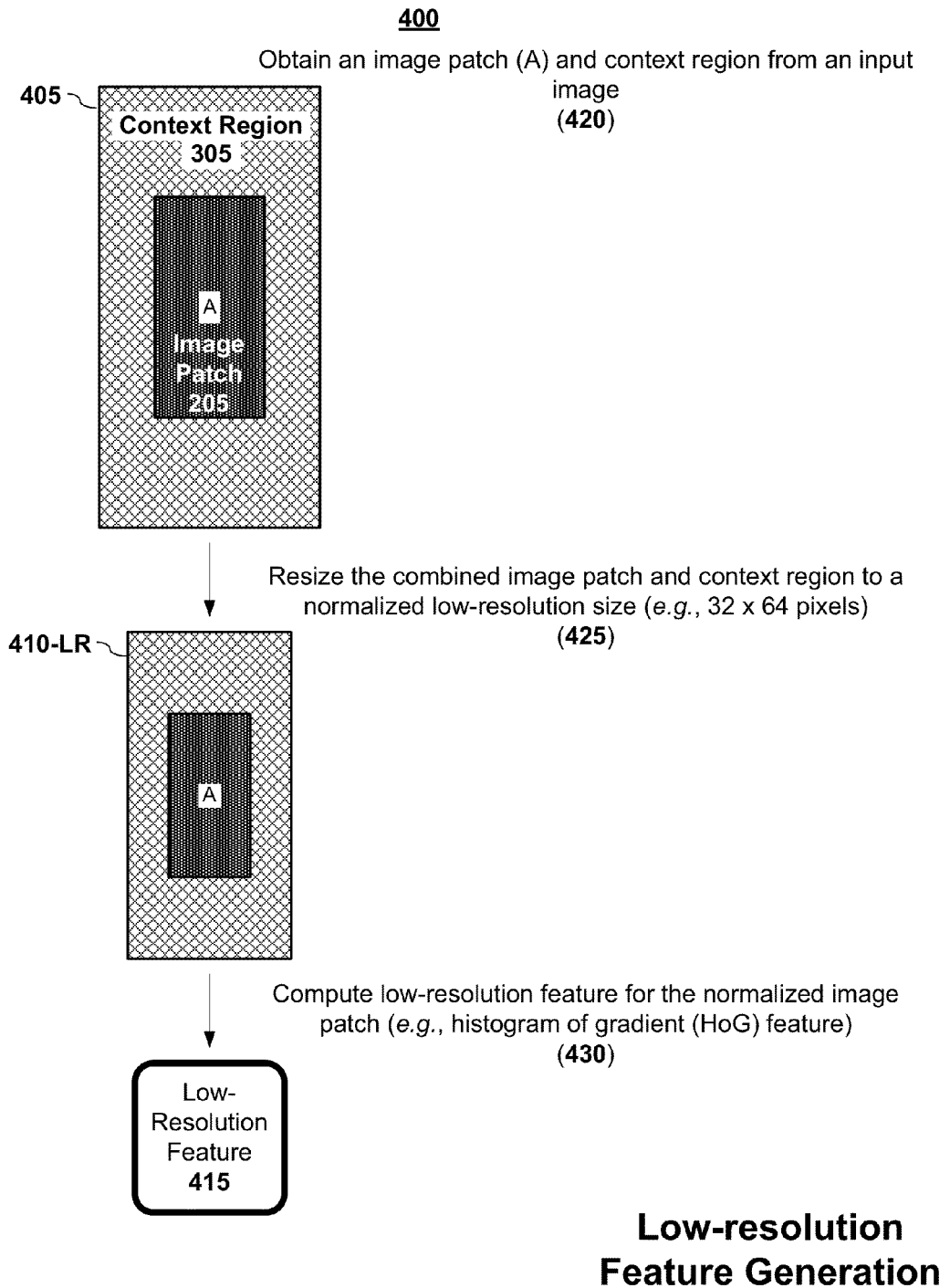
FIG. 4 presents a method for forming a low-resolution, or low-scale, feature according to embodiments of the present invention.

Returning to FIG. 1, a high-resolution feature is computed (110) using the image patch sized to a high-resolution size. FIG. 2 presents a method for forming a high-resolution feature according to embodiments of the present invention. A mid-resolution feature is also computed (115) using the image patch and the context region sized to a mid-resolution size. FIG. 3 presents a method for forming a mid-resolution feature according to embodiments of the present invention. A low-resolution feature is computed (120) using the image patch and the context together sized to a low-resolution size. FIG. 4 presents a method for forming a low-resolution feature according to embodiments of the present invention. It shall be noted that no particular order is necessary for forming the high-, mid-, and low-resolution features. Rather, these features may be formed in different orders or even formed concurrently. Finally, a multi-scale feature for the image patch may be generated (125) for the image patch using its high-, mid-, and low-resolution features. Also as explained in more detail below, embodiments of the multi-scale feature may also include a perspective context feature or features.

High-Resolution Feature

FIG. 2 presents a method 200 for forming a high-resolution feature according to embodiments of the present invention. As illustrated in FIG. 2, in embodiments, an image patch (A) 205 is obtained from an input image. The image patch may be obtained in like manner as described with reference to FIG. 1. In embodiments, the image patch 205 is resizes to a normalized high-resolution size (e.g., 64×128 pixels, although other sizes may be used). The normalized image patch 205-HR is used to compute (225) a high-resolution feature 210. In embodiments, the feature may be a histogram of gradient (HoG) feature descriptors, which is well known to those of skill in the art. It shall be noted that other methods may be used to generate a feature from the normalized image patch. For example, possible alternatives include, but are not limited to, LBP (Local Binary Pattern), Shapelet, Harr, Channel Features, and etc. It shall also be noted that in alternative embodiments, one or more features may be extracted from the context region and combined with the feature from the image patch in forming a high-resolution feature. Examples of ways to combine the features include, but are not limited to, adding, concatenating, subtracting, averaging, and the like.

Mid-Resolution Feature(s)

FIG. 3 presents a method 300 for forming a mid-resolution feature or features according to embodiments of the present invention. As illustrated in FIG. 3, in embodiments, an image patch (A) 205 and context region 305 are obtained from an input image. The image patch and context region may be obtained (325) as described previously. It shall be noted that, in embodiments, the step of obtaining the image patch and context region may be done once in preparation for generating the multi-scale feature or features. In embodiments, the image patch 205 is resized (330) to a normalized mid-resolution size (e.g., 32×64 pixels, although other sizes may be used).

In embodiments, the context region 305 is divided to form three portions. As depicted in the embodiment in FIG. 3, the context region is divided into regions 1, 2, and 3, and the like-numbered regions are combined into three patches 310-1, 310-2, and 310-3. It shall be noted that the context region may be divided into different portions or regions, and may be combined in different ways. In embodiments, each portion 310-$x$ has or is normalized to the mid-resolution size. One skilled in the art shall recognize that the resizing, when needed, may be done in different order or different configurations. For example, in embodiments, the context region with the image patch may together be resized to twice the mid-resolution size (e.g., 64×128 pixels). Thus, each group of regions (310-1, 310-2, and 310-3) forms a patch of the same size as the center scan window image patch 205-MR (32×64 pixels, in this example).

A mid-resolution feature 315-$x$ is computed (335) for each of the four normalized regions (205-MR, 310-1, 310-2, and 310-3). In embodiments, the feature may be a histogram of gradient (HoG) feature descriptors, although other methods may be used to generate a feature from the normalized regions.

In embodiments, the mid-resolution features 315-$x$ may be combined (340) into one or more mid-resolution feature descriptors. In embodiments, the mid-resolution feature of the image patch 315-A may be one mid-resolution feature descriptor and the mid-resolution feature descriptors 315-1, 315-2, and 315-3 of the context portions may be combined (340) into another mid-resolution feature. In alternative embodiments, these two features may be combined into a single feature. One skilled in the art shall recognize that features may be combined in a number of ways, such as addition, concatenation, subtraction, averaging, etc. For example, in embodiments, the features may be combined by stacking the normalized histograms into a single HoG vector.

Low-Resolution Feature

FIG. 4 presents a method 400 for forming a low-resolution feature according to embodiments of the present invention. As illustrated in FIG. 4, in embodiments, an image patch (A) 205 and context region 305 are obtained from an input image. The image patch and context region may be obtained (420) as previously described. Also as previously noted, the step of obtaining the image patch and context region may be done once in preparation for generating the multi-scale feature or features. In embodiments, the context region together with the image patch 405 are resized (425) to a low-resolution size (e.g., 32×64 pixels, although other sizes may be used). A low-resolution feature 415 is computed (430) from the normalized low-resolution context region and image patch 410-LR. In embodiments, the feature may be a histogram of gradient (HoG) feature descriptors, although other methods may be used to generate a feature from the normalized regions.

Perspective Context Features

It is not uncommon for objects of interest in images to appear at certain regions and with certain sizes. Information such as location and size of the object in an image can provide important perspective context of the camera. Embodiment of the present invention may generate and use this contextual information to aid in object recognition.

Figure 5:
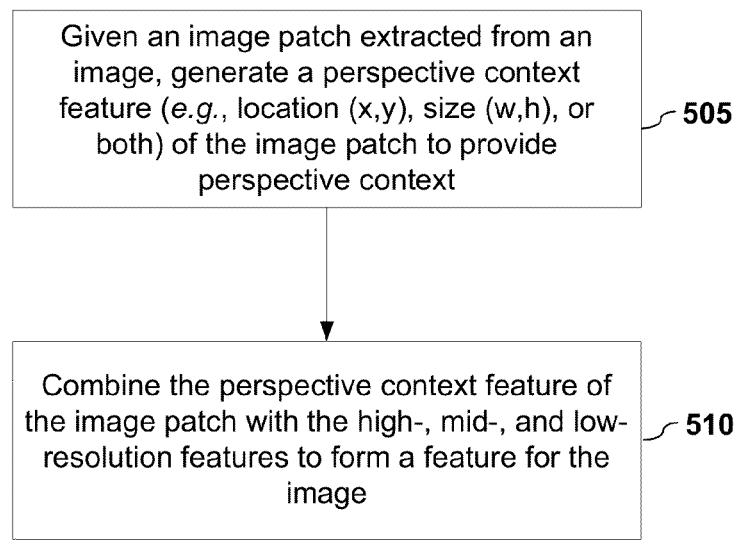
FIG. 5 depicts a method for generating a perspective context feature according to embodiments of the present invention.

FIG. 5 depicts a method for generating a perspective context feature according to embodiments of the present invention. As depicted in FIG. 5, given an image patch from an image, a perspective context feature of the image feature is generated. In embodiments, the perspective context feature comprises the location (x,y) of the image patch within the image and the size (w,h) of the image patch. The location (x,y) may represent the position of a set reference point of an image patch, such as its center pixel location, a corner pixel location, or the like. The size (w,h) of the image patch may represent the width and height of the image patch. In embodiments, the perspective context descriptor may be in the form of (x,y,w,h). One skilled in the art shall recognize the perspective context descriptor may be in different forms and configurations.

Returning to FIG. 5, the perspective context descriptor of an image patch may be combined (510) with one or more of the high-, mid-, and low-resolution features. In embodiments, the perspective context descriptor is combined with the high-, mid-, and low-resolution features to form a single feature, a multi-scale and perspective feature, for an image patch. In embodiments, the multi-scale and perspective feature may be formed by stacking all of the features into a single vector.

Multi-Scale and Perspective Feature Combinations

It shall be noted that any of the high-resolution, mid-resolution, low-resolution, and perspective features, or any constitute parts thereof, may be combined into features. For example, in embodiments, a high-resolution feature and a low-resolution feature may be combined to form a feature. Or, by way of another example, the high-resolution feature may be combined with the perspective feature. In yet another example, the mid-resolution feature of the just the image patch may be combined with the low-resolution and perspective features to form a feature. One skilled in the art shall recognize that any number of permutations and combinations of the features may be used to form composite features.

Training and Detecting using Multi-Scale and Perspective Features

Detection algorithms usually comprise two parts: (1) training, in which classifiers are trained, and (2) classification, which uses the trained classifiers for detection. In embodiments, the multi-scale and perspective features may be used in both training a detection model and in detecting the objects of interest in images.

Training using Multi-Scale and Perspective Context Features

Figure 6:
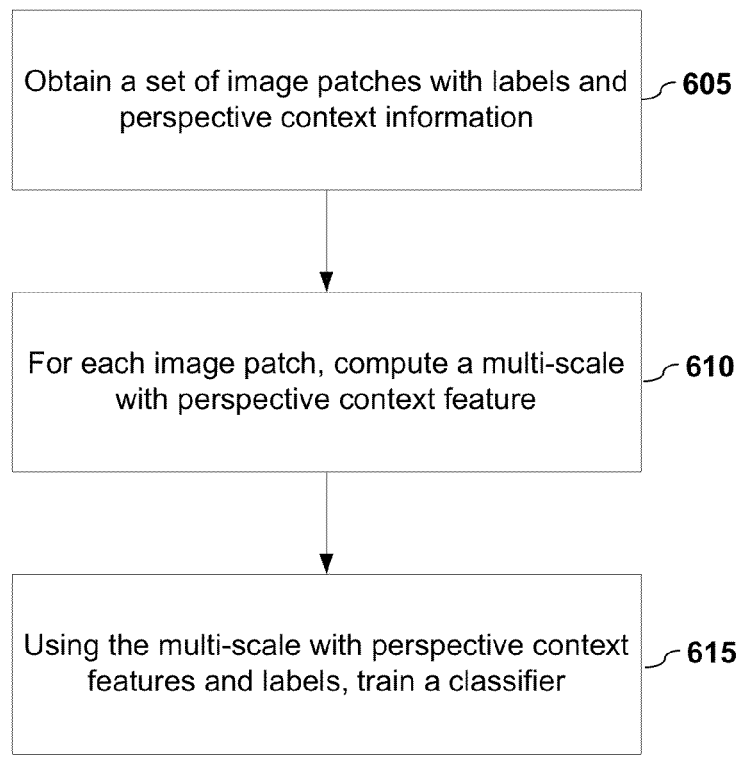
FIG. 6 depicts a process flow for training a detection system using multi-scale and perspective features according to embodiments of the present invention.
Figure 7:
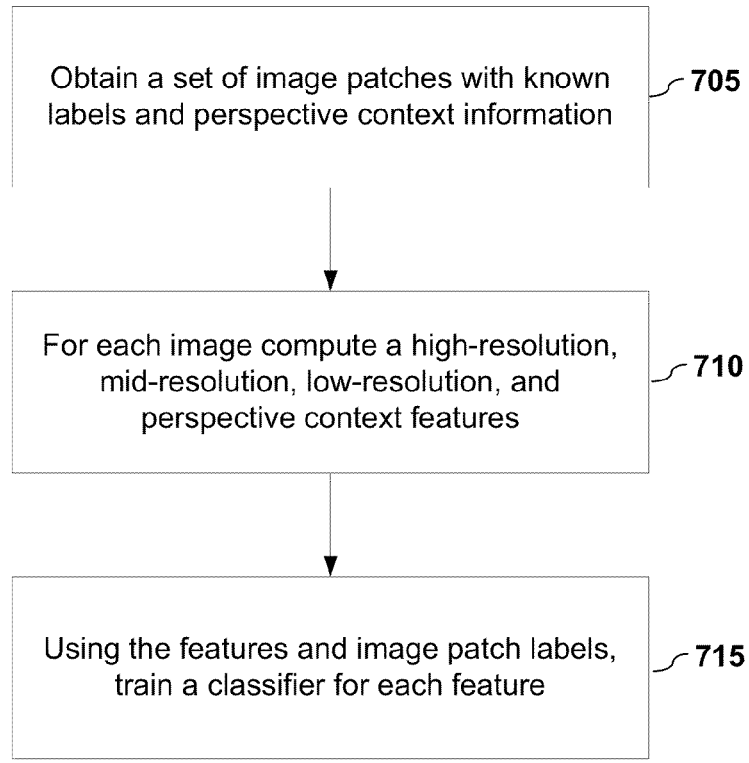
FIG. 7 depicts a process flow for training a detection system using multi-scale and perspective features according to embodiments of the present invention.

It shall be noted that the high-resolution, mid-resolution, low-resolution, and perspective features may be combined and used in different combinations, which affects the training process. By way of example and not limitation, two possible combinations are presented below with respect to FIGS. 6 and 7. FIG. 6 depicts classifier training in which the high-resolution, mid-resolution, low-resolution, and perspective features are all combined into a single feature and a classifier is trained for that feature. FIG. 7 depicts classifier training in which a classifier is trained for each of the high-resolution, mid-resolution, low-resolution, and perspective features.

FIG. 6 depicts a process flow for training a detection system using multi-scale and perspective features according to embodiments of the present invention. In embodiments, the process commences by obtaining (605) a set of training image patches that include labels indicating whether an image patch does or does not include the object of interest and perspective context information. In embodiments, the set of labeled training image patches may be obtained from input images using an existing detector or detectors, such as AdaBoost or SVM, and the ground truth information. Alternatively, the training image patches may be obtained from third-party training image sets.

In embodiments, for each image patch, a multi-scale with perspective context feature is generated (610). The multi-scale with perspective context feature may be obtained as explained previously with reference to FIGS. 1-5. In embodiments, the multi-scale with perspective context feature for an image patch forms a vector. In embodiments, a classifier training phase comprises using (615) the image patches and multi-scale with perspective context features to train a classifier, as is well known to those of skill in the art. The trained classifier may be used to detect objects of interest in subsequent input images.

FIG. 7 depicts a process flow for training a detection system using multi-scale and perspective features according to embodiments of the present invention. In embodiments, the process commences by obtaining (705) a set of training image patches, which include labels indicating whether an image patch does or does not include the object of interest and includes perspective context information. In embodiments, the set of labeled training image patches may be obtained as discussed above with respect to FIG. 6.

In embodiments, for each image patch, high-resolution, mid-resolution, low-resolution, and perspective context features are generated (710). The high-resolution, mid-resolution, low-resolution, and perspective context feature may be obtained as explained previously with reference to FIGS. 2-5. In embodiments, these features and/or any combination of two or more of these features may form features used to train corresponding classifiers for use in object detection. In embodiments, each feature used for training a classifier and for detection forms a vector. In embodiments, a classifier training phase comprises using (715) the image patches and the features to train a classifier for each feature. Training of classifiers using features is well known to those of skill in the art. The trained classifiers may then be used to detect objects of interest in other input images.

Detecting Using Trained Classifier(s)

Figure 8:
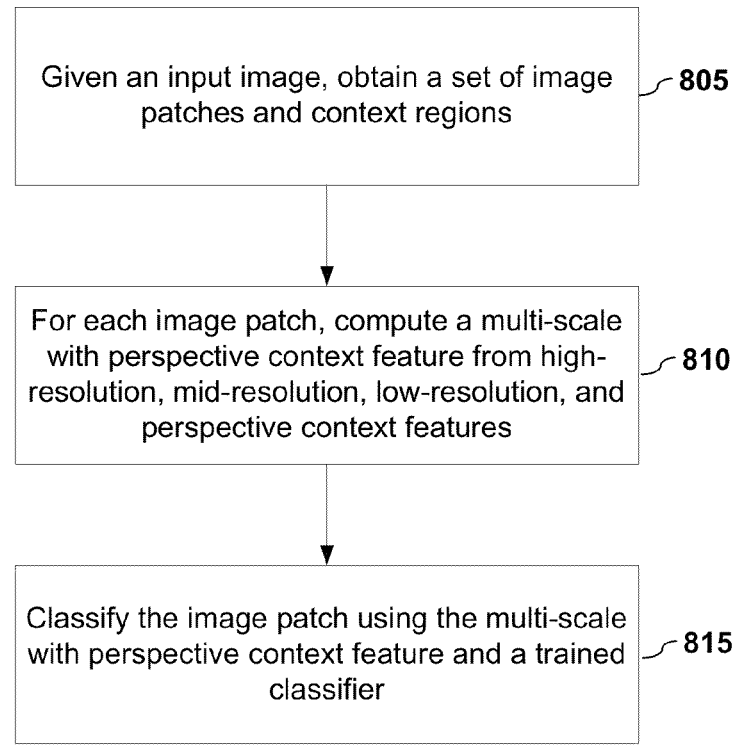
FIG. 8 depicts a process flow for using a detection system that includes a classifier trained using multi-scale with perspective context features according to embodiments of the present invention.

Given trained classifier or classifiers, this classifier or classifiers may be used as part of a detection system to detect objects of interest in images. FIG. 8 depicts a process flow for using a detection system that includes a classifier trained using multi-scale with perspective context features according to embodiments of the present invention.

In embodiments, the process commences by obtaining (805) one or more image patches to form a set of image patches. In embodiments, the set of image patches may be obtained from one or more input images using an existing detector or detectors, such as AdaBoost or SVM. In embodiments, the confidence value(s) of the initial detector may be set so that the detected images are over-inclusive, thereby reducing the possibility of excluding true image patches in the initial detection. As result of being over-inclusive, a large number of false positives will be included; however, the subsequent detection can assist in eliminating these false positives. In embodiments, the image patches may be all or some subset of the scan windows from an input image. It shall be noted that the image patches may be in the form of locations in an image.

In embodiments, for an image patch, a multi-scale with perspective context feature is computed (810) from the high-resolution, mid-resolution, low-resolution, and perspective context features generated from the image patch. A multi-scale with perspective context feature for an image patch may be obtained as explained above. After forming a multi-scale with perspective context feature, the object detection phase comprises using (815) the feature for the image patch and the trained classifier to determine whether the image contains the object of interest. For example, in embodiments, the classifier applied to an image patch outputs a score that may be used to determine whether the object of interest is present in the image patch, subject to the score meeting threshold value requirement. It shall be noted that meeting a threshold value requirement may mean equaling or exceeding a threshold value or may mean exceeding a threshold value. As can be seen by the provided description, embodiments of the object detection of the current application can allow for improved object detection using multi-scale and perspective information.

Figure 9:
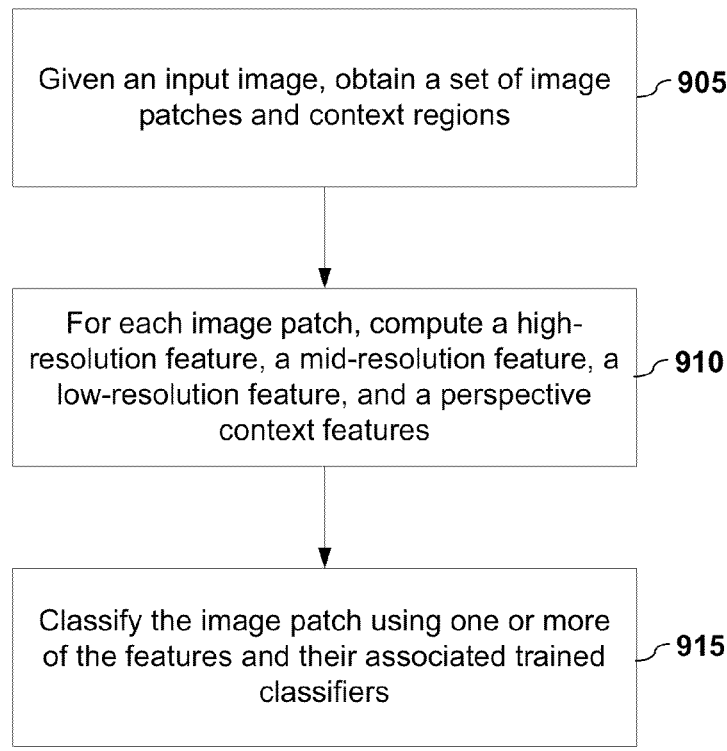
FIG. 9 depicts an alternative object detection method using different combinations of multi-scale and perspective feature trained classifiers according to embodiments of the present invention.

FIG. 9 depicts an alternative object detection method using different combinations of multi-scale and perspective feature trained classifiers according to embodiments of the present invention. In contrast to the method depicted in FIG. 8 which had a single classifier, the method of FIG. 9 has multiple trained classifiers.

In embodiments, the process commences by obtaining (905) one or more image patches, which may be obtained as previously discussed. In embodiments, for an image patch, a high-resolution, mid-resolution, low-resolution, and perspective context features are obtained (910) for the image patch—just was done for the method of FIG. 8. However, unlike the method of FIG. 8 in which all the features were combined into a single multi-scale with perspective context feature, the individual features may also be used. Alternatively or additionally, different permutations and different combinations of any of the features may be used alone or in concert for training and detection. One skilled in the art shall recognize, however, that each unique feature or feature composite should have a corresponding trained classifier.

After forming the features, the object detection phase comprises using (915) one or more of the features for the image patch and one or more of the corresponding trained classifiers to classify the image patch.

In an embodiment, a classifier may be selected based upon most closely matching the size of the input image patch. For example, if the image patch has a size equals to or close to the mid-resolution size, the trained mid-resolution classifier may be used in conjunction with the mid-resolution feature of the image patch to classify that image patch. One skilled in the art shall recognize that if such an embodiment is employed, then only the size-corresponding feature need be generated. In embodiments, the size-corresponding feature may include the perspective context feature. In yet other alternative embodiments, the size-corresponding feature classification may be compared with, or used in conjunction with, one or more other classifications, such as with a multi-scale feature classification, when classifying whether or not image patch contains the object of interest base upon classifier outputs. One skilled in the art shall recognize other combinations and configurations that may be employed.

FIG. 10 depicts some sample object detection results according to embodiments of the present invention. FIG. 10 compare detection rates (precision/recall) and the corresponding processing time with respect to different configuration or embodiments of feature resolutions performed using captured datasets. As shown, when the features are extracted at higher resolution (36×72) (i.e., the normalized image patch size of 36×72 pixels), it achieved comparatively higher precision and recall. But, when lower resolution (12×24) is used, the running time is smaller. However, in embodiments, a scale-adaptive feature extraction (i.e., the features are extracted according to the size of the original image patch and the closest resolution is chosen for extracting features) achieved even higher precision and recall while at a comparably low running time cost. One skilled in the art shall recognize that other scale-adaptive configurations may be used.

Figure 11:
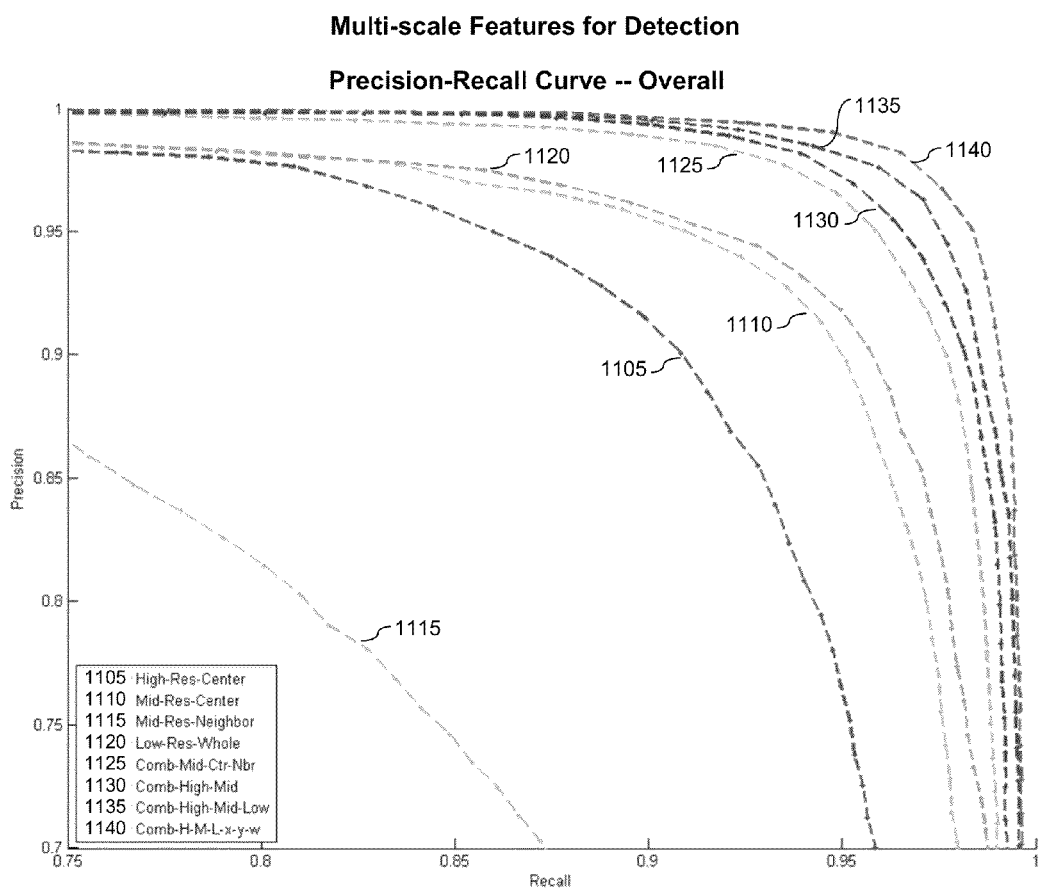
FIG. 11 also depicts some sample object detection results according to embodiments of the present invention.

FIG. 11 also depicts some sample object detection results according to embodiments of the present invention. FIG. 11 compare the detection rates (in terms of Receiver Operating Characteristic (ROC) curves) of different embodiments of proposed context feature components. As shown, the combination of all feature components (a multi-scale feature with perspective context) 1140 achieved the highest detection rates on the sample image datasets.

System Embodiments

Figure 12:
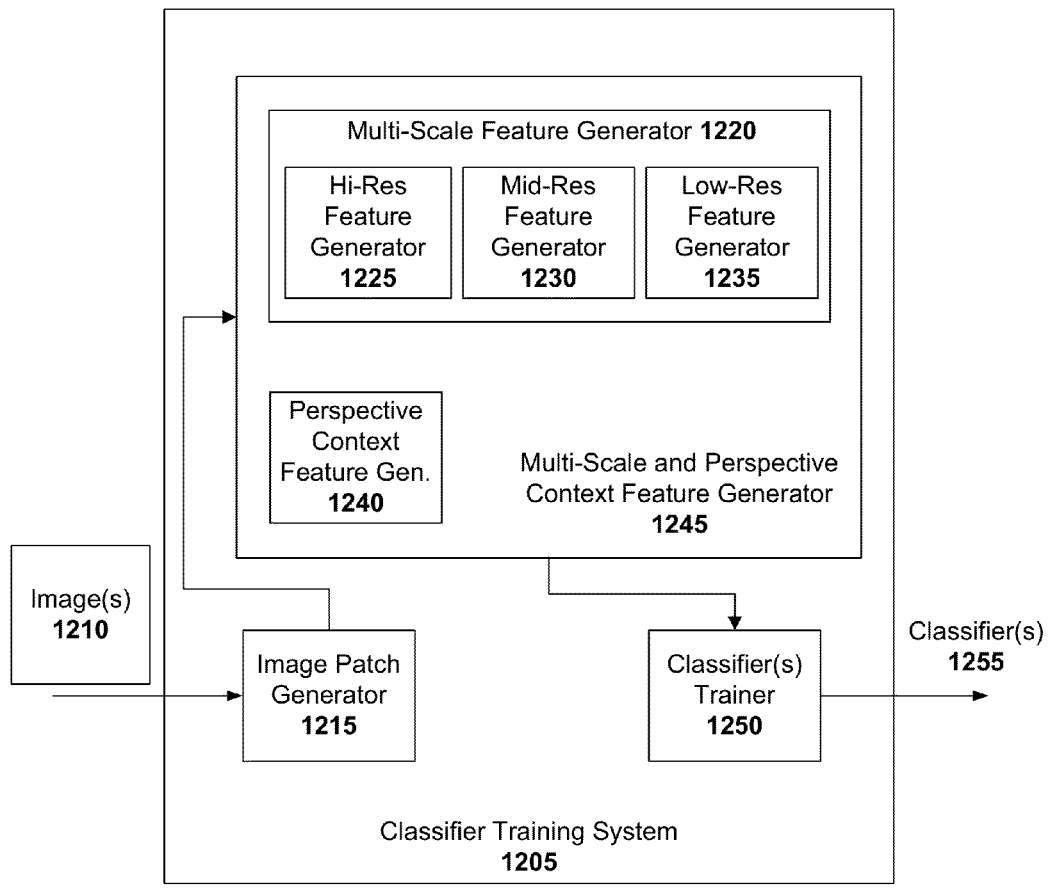
FIG. 12 depicts a classifier training system according to embodiments of the present invention.

FIG. 12 depicts a classifier training system according to embodiments of the present invention. The system 1205 comprises an image patch generator 1215, a multi-scale and perspective context feature generator 1245, and a classifier or classifiers trainer 1250. In the depicted embodiment, the multi-scale and perspective context feature generator 1245 comprises a perspective context feature generator 1240 and a multi-scale feature generator 1220. One skilled in the art shall recognize that other system configurations may be used to perform the classifier training. It shall also be noted that a system may be configured for both training and detection and that the same or like components for both tasks may be configured to function in both capacities. In embodiments, system 1205, or parts thereof, may be implemented using a computing system, such as one described with reference to FIG. 14.

In embodiments, image patch generator 1215 receives one or more images 1210 and generates image patches from the one or more image or images 1210. In embodiments, image patch generator 1215 may use one or more existing detector or detectors, such as (by way of example and not limitation) AdaBoost or SVM, to extract image patches and perspective context information from one or more input images. One skilled in the art shall recognize that if the image patches and perspective information are supplied directly to the classifier training system, image patch generator 1215 may not be used or may be omitted from the classifier training system. In any event, image patches with labels indicating whether the image patch does or does not include the object of interest are provided to the multi-scale and perspective feature generator 1245 and to the classifier trainer 1250.

The multi-scale and perspective feature generator 1245 receives the image patches and perspective context information and generates one or more features according to the various embodiments. In embodiments, the multi-scale feature generator 1220 comprises a high-resolution feature generator 1225, a mid-resolution feature generator 1230, and a low-resolution feature generator 1235. In embodiment, the high-resolution feature generator 1225 produces high-resolution features for image patches using one or more methods previously described with reference to FIG. 2. In embodiment, the mid-resolution feature generator 1230 produces mid-resolution features for image patches using one or more methods previously described with reference to FIG. 3. In embodiment, the low-resolution feature generator 1235 produces low-resolution features for image patches using one or more methods previously described with reference to FIG. 4. The multi-scale and perspective feature generator 1245 further comprises a perspective context feature generator 1240 that generates one or more perspective context features using one or more methods previously described with reference to FIG. 5. One skilled in the art shall recognize that the image patch generator 1215 may operate as the perspective context feature generator when it identifies a location and size of an image patch. In embodiments, the multi-scale and perspective context feature generator 1245 may combine two or more of the features for an image patch into a feature. One skilled in the art shall recognize that a number of combinations may be formed by generator 1245, some of which are discussed above with respect to FIGS. 6 and 7. For example, by way of illustration and not limitation, the multi-scale and perspective context feature generator 1245 may combine the high-resolution feature, the mid-resolution features, the low-resolution feature, and the perspective context feature for an image patch into a single multi-scale with perspective context feature for the image patch.

In embodiments, the multi-scale and perspective context feature generator 1245 provides features associated with the image patches to the classifier trainer 1250. The classifier trainer 1250 uses the features and the associated labels to train one or more classifiers. The trained classifier or classifiers may then be used for object detection in images.

Figure 13:
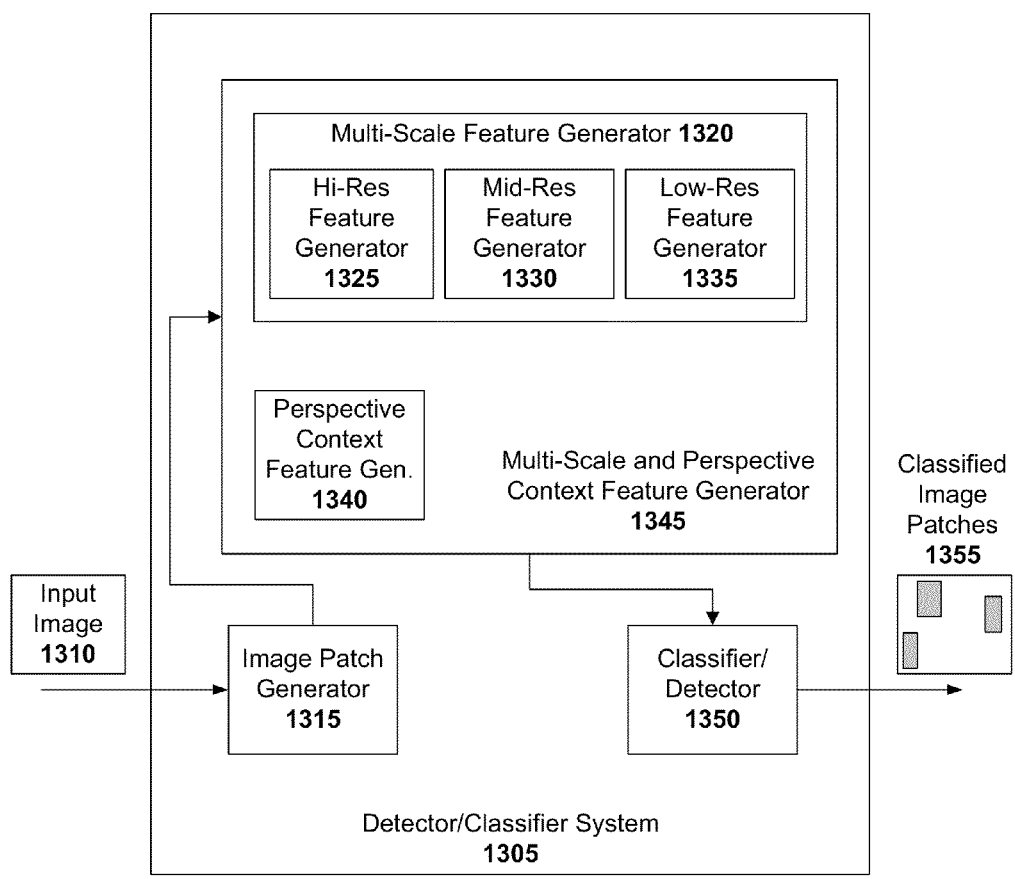
FIG. 13 depicts a classifier/detector system according to embodiments of the present invention.

FIG. 13 depicts a classifier/detector system 1305 according to embodiments of the present invention. The system 1305 comprises an image patch generator 1315, a multi-scale and perspective context feature generator 1345, and a classifier/ 1350. In the depicted embodiment, the multi-scale and perspective context feature generator 1345 comprises a perspective context feature generator 1340 and a multi-scale feature generator 1320. In embodiments, system 1305, or parts thereof, may be implemented using a computing system, such as one described with reference to FIG. 14. One skilled in the art shall recognize that other configurations may be used to perform classification. It shall be noted that, in embodiments, training system 1205 differs from classifier system 1305 in the training module 1250 and detector 1350. Accordingly, one skilled in the art shall recognize that a combined system that can perform both training and classifying may be created by including with the common components a training module and a detector and a switching means, such as a mechanical or software implemented switch, to switch between the two modes.

In embodiments, image patch generator 1315 receives one or more images 1310 and identifies image patches in one or more image or images 1310 supplied to the classifier system 1305. In embodiments, the image patch generator 1315 also identifies perspective context information, such as image patch size and image patch position, for each image patch. In embodiments, image patch generator 1315 may use one or more existing detector or detectors, such as (by way of example and not limitation) AdaBoost or SVM, to extract image patches and perspective context information from one or more input images. The image patches with their associated perspective context information are provided to the multi-scale and perspective feature generator 1345.

The multi-scale and perspective feature generator 1345 receives the image patches and perspective context information and generates one or more features according to the various embodiments. In embodiments, the multi-scale feature generator 1320 comprises a high-resolution feature generator 1325, a mid-resolution feature generator 1330, and a low-resolution feature generator 1335. In embodiment, the high-resolution feature generator 1325 produces high-resolution features for image patches using one or more methods previously described with reference to FIG. 2. In embodiment, the mid-resolution feature generator 1330 produces mid-resolution features for image patches using one or more methods previously described with reference to FIG. 3. In embodiment, the low-resolution feature generator 1335 produces low-resolution features for image patches using one or more methods previously described with reference to FIG. 4. The multi-scale and perspective feature generator 1345 further comprises a perspective context feature generator 1340 that generates one or more perspective context features using one or more methods previously described with reference to FIG. 5. One skilled in the art shall recognize that the image patch generator 1315 may operate as the perspective context feature generator when it identifies a location and size of an image patch.

In embodiments, the multi-scale and perspective context feature generator 1345 may combine two or more of the features for an image patch into a feature. One skilled in the art shall recognize that a number of combinations may be formed by generator 1345 with use in classification, as discussed previously. For example, by way of illustration and not limitation, the multi-scale and perspective context feature generator 1345 may combine the high-resolution feature, the mid-resolution features, the low-resolution feature, and the perspective context feature for an image patch into a single multi-scale with perspective context feature for the image patch.

In embodiments, the multi-scale and perspective context feature generator 1345 provides features associated with the image patches to the classifier 1350. The detector/classifier 1350 receives the feature for an image patch, which is input to a corresponding classifier. In embodiments, responsive to the output of the classifier for that feature meeting or exceeding a threshold level, the image patch is deemed to contain the object of interest; otherwise, the image patch is deemed to not contain the object of interest.

In embodiments, a user may select the feature and/or corresponding classifier to be used in detection. For example, system 1305 may allow a user to use a single multi-scale with perspective context feature (such as the method of FIG. 8). Alternatively, a user may select different approaches, such as discussed with respect to FIG. 9. For example, in embodiments, the scale/resolution feature may be selected to make the size of the image patch. Accordingly, a corresponding scale/resolution classifier may be used for detecting. In embodiments, the system may perform multiple detection methods for the same image patch.

Cascaded Object Detection Using Features from Enclosing Regions

It shall be noted that aspects of the features presented herein may also be used in conjunction with, or separately from, the multi-scale features systems and methods. For example, embodiments of features disclosed herein may be used in cascaded object detection systems and methods.

As noted previously, existing methods typically only use features from the image patch, which results in high false detection rates. Even when cascaded systems have been employed to help reduce the high false detection rates, the cascaded system classifiers typically only use different descriptors that extracted from the same region (i.e., the image window or image patch). Such systems are only moderately successful in reducing the high false detection rates because the information extracted from the same region is generally still not discriminative enough.

In embodiments, cascaded systems and methods use feature descriptors extracted from a context region for an image patch as a second stage of the cascaded classifier to reduce false detection rates. In embodiments, these feature descriptors extracted for the context region are the same type as extracted for the image window.

Figure 14:
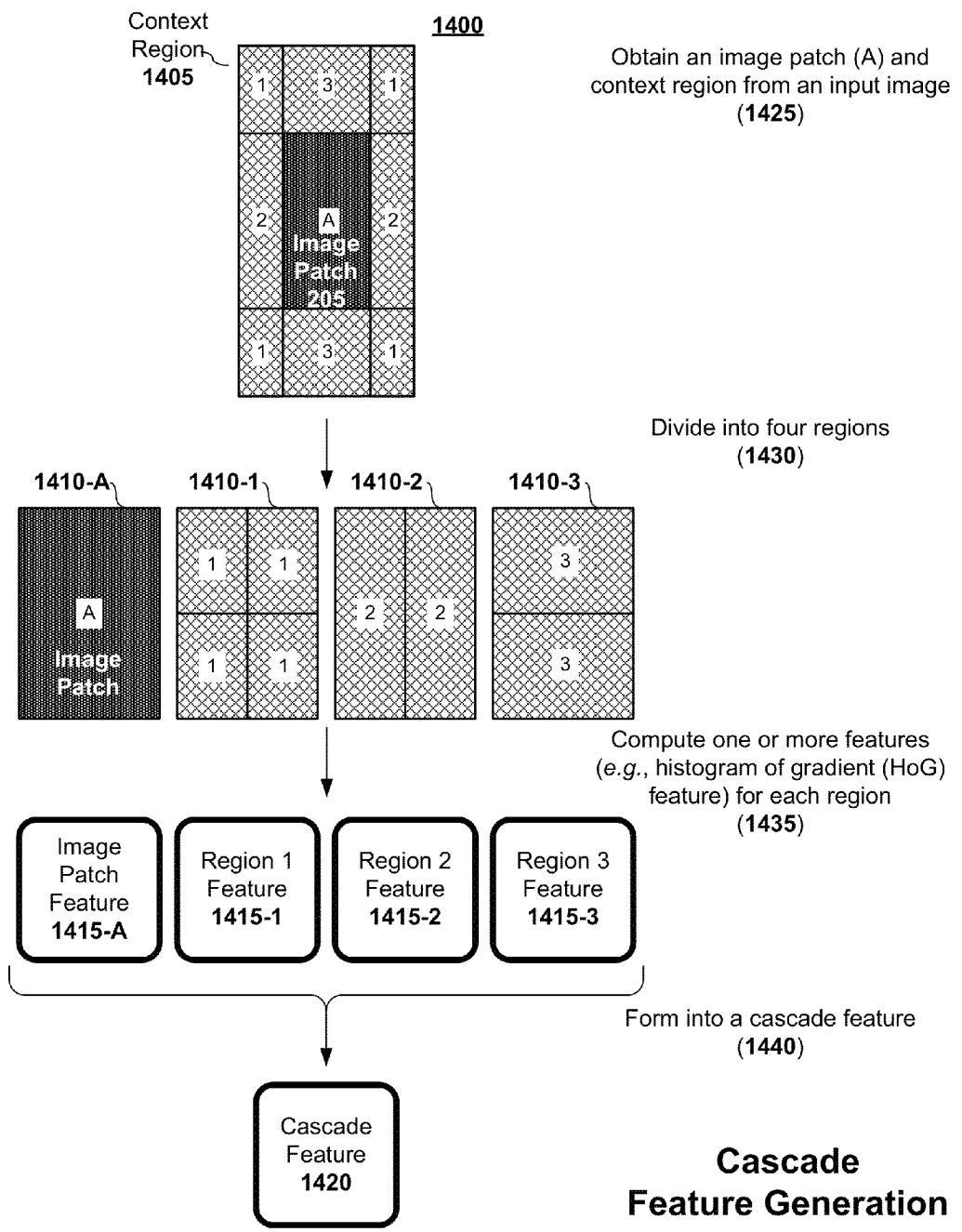
FIG. 14 depicts a method for generating a cascade feature for an image patch according to embodiments of the present invention.

FIG. 14 depicts a method for generating a cascade feature for an image patch according to embodiments of the present invention. In embodiments, a cascade feature generation process may comprise obtaining an image window (e.g., image window 205) and an enclosing region (e.g., context region 1405) with the same center location. Similar to the mid-resolution feature (see FIG. 3 and the corresponding written description), in embodiments, the context region is divided to form three groups or regions. As depicted in the embodiment in FIG. 14, the context region is divided into regions 1, 2, and 3, and the like-numbered regions are combined into three patches or regions (e.g., 1410-1, 1410-2, and 1410-3). It shall be noted that the context region may be divided into different portions or regions, and may be combined in different ways. In embodiments, if the image window has dimensions l×w and the context region has dimensions double that (2l×2w), each group of regions (e.g., 1410-1, 1410-2, and 1410-3) forms a patch of the same size as the center scan window image patch (e.g., 1410-A/205). Additionally, or in alternative embodiments, one or more of the image portions (e.g., 1410-x) may be normalized to a set size, similar to the mid-resolution features of FIG. 3.

One or more features may then be computed for each of the four regions. In embodiments, a histogram of gradient (HoG) feature descriptors may be computed for each of the regions. One skilled in the art shall recognize that other methods or features may be used. In embodiments, the HoG features for the three context region portions (e.g., 1410-1, 1410-2, and 1410-3) are averaged and subtracted by the HoG of the image patch (e.g., 1410-A/205) to form a cascade feature 1420, which may be used for a second stage of cascaded classifiers. One skilled in the art shall recognize that other feature combination may be used for the cascade feature.

Figure 15:
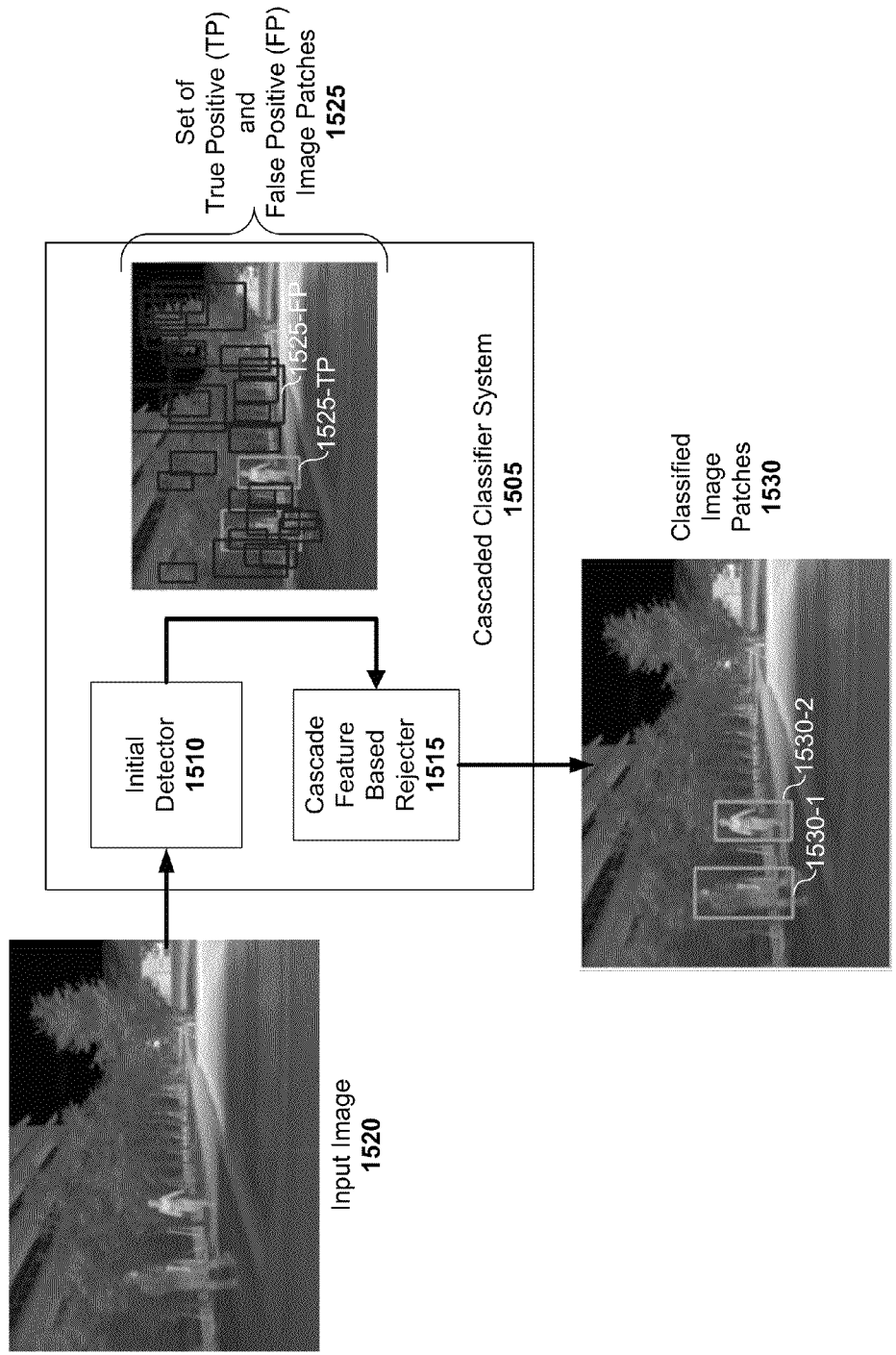
FIG. 15 depicts system and method embodiments of a cascaded classifying according to embodiments of the present invention.

FIG. 15 depicts system and method embodiments of a cascaded classifying according to embodiments of the present invention. In embodiments, the cascaded classifier system 1505 comprises an initial, or first stage, detector 1510 and a cascade-feature-based rejecter 1515 as a second stage classifier. In embodiments, the first stage comprises a HoG Adaboost detector using features extracted from the image patch (e.g., image patch 1410-A/205). This stage yields a set of image patches 1525 that are labeled as containing the object of interest. However, there are likely to be a number of false positives (e.g., 1525-FP). Accordingly, a second stage classification may be performed on the set of image patches 1525 to filter out some or all of the false positives. In embodiments, the second stage, or cascaded, classifier 1515 is a difference-HoG-Feature classifier or rejecter that uses the cascade feature 1420, or some version thereof, to improve the precision by rejecting some of the false detections.

One skilled in the art shall recognize that cascade feature, the cascade systems, the cascade methodologies, may be combined with other features, systems, and methods previously discussed or referenced herein.

Figure 16:
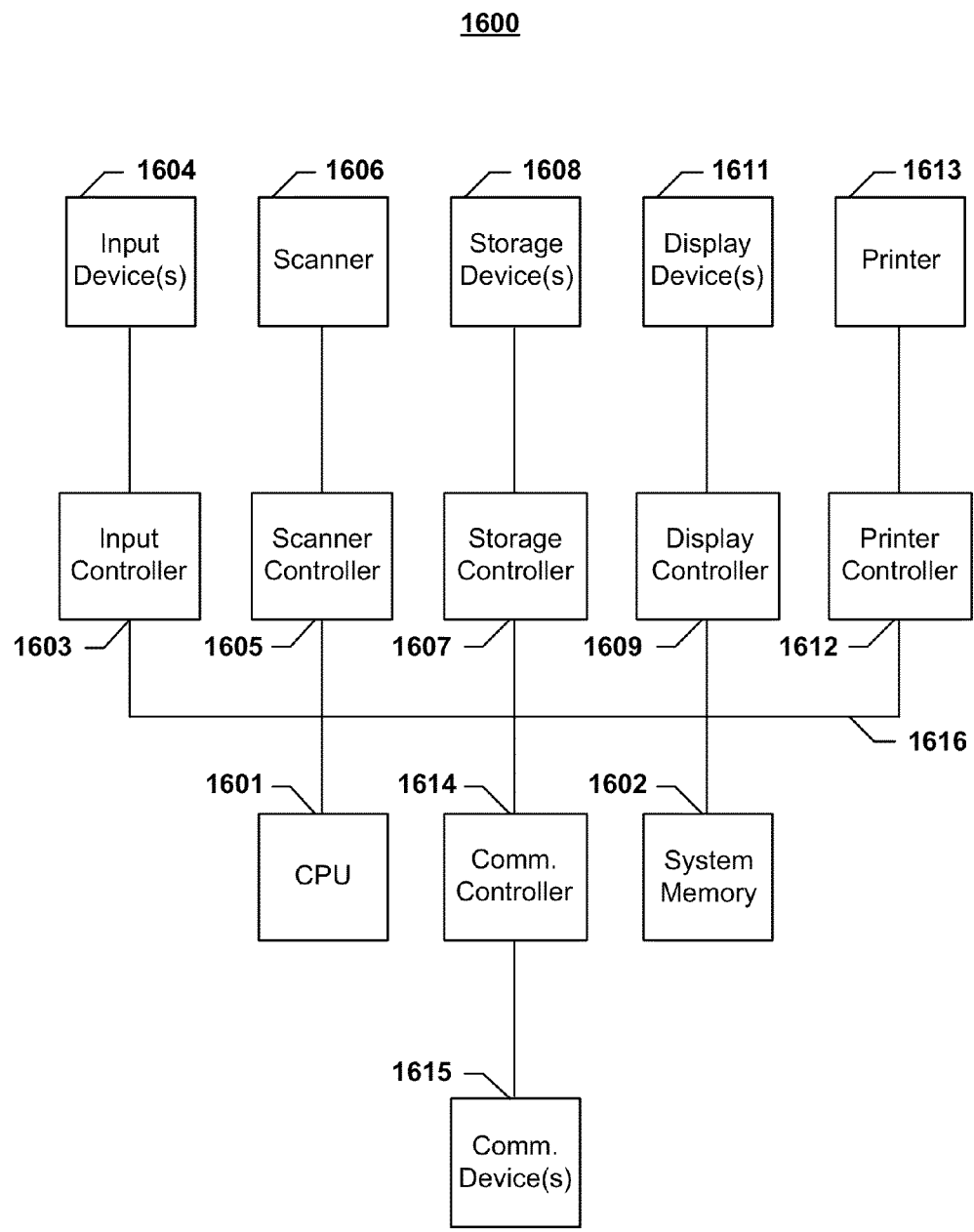
FIG. 16 is a block diagram illustrating an exemplary system which may be used to implement aspects of the present invention.

Having described the details of embodiments the various inventions, an exemplary system 1600, which may be used to implement one or more aspects of the present inventions, will now be described with reference to FIG. 16. As illustrated in FIG. 16, the system includes a central processing unit (CPU) 1601 that provides computing resources and controls the computer. The CPU 1601 may be implemented with a microprocessor or the like, and may also include a graphics processor and/or a floating point coprocessor for mathematical computations. The system 1600 may also include system memory 1602, which may be in the form of random-access memory (RAM) and read-only memory (ROM).

A number of controllers and peripheral devices may also be provided, as shown in FIG. 16. An input controller 1603 represents an interface to various input device(s) 1604, such as a keyboard, mouse, or stylus. There may also be a scanner controller 1605, which communicates with a scanner 1606. The system 1600 may also include a storage controller 1607 for interfacing with one or more storage devices 1608 each of which includes a storage medium such as magnetic tape or disk, or an optical medium that might be used to record programs of instructions for operating systems, utilities and applications which may include embodiments of programs that implement various aspects of the present invention. Storage device(s) 1608 may also be used to store processed data or data to be processed in accordance with the invention. The system 1600 may also include a display controller 1609 for providing an interface to a display device 1611, which may be a cathode ray tube (CRT), a thin film transistor (TFT) display, or other type of display. The system 1600 may also include a printer controller 1612 for communicating with a printer 1613. A communications controller 1614 may interface with one or more communication devices 1615, which enables the system 1600 to connect to remote devices through any of a variety of networks including the Internet, a local area network (LAN), a wide area network (WAN), or through any suitable electromagnetic carrier signals including infrared signals.

In the illustrated system, all major system components may connect to a bus 1616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on any suitable non-transitory computer-readable medium. Alternatively, any of the methods or steps thereof may be implemented using functionally equivalent hardware (e.g., application specific integrated circuit (ASIC), digital signal processing circuitry, etc.) or a combination of software and hardware. In embodiments, one or more of the methods may be implemented using one or more processing units/systems.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A non-transitory computer-readable medium or media comprising one or more sequences of instructions which, when executed by one or more processors, causes steps to be performed comprising:

for each image patch from a set of one or more image patches from an image:

generating a context region for the image patch comprising at least a portion of the image; and constructing a multi-scale feature comprising two or more of:
a high-scale feature comprises one or more features extracted from the image patch at a high-resolution size;
a mid-scale feature comprises one or more features extracted from the image patch at a mid-resolution size; and
a low-scale feature comprises one or more features extracted from a combined image patch at a low-resolution size, the combined image patch comprising the image patch and the context region;
wherein the mid-scale feature comprises a combination of the one or more features extracted from the image patch at the mid-resolution size and one or more features extracted from the context region; and
wherein the one or more features extracted from the context region comprises:
forming the context region into a plurality of regions;
for each region from the plurality of regions that does not have a mid-resolution size, re-sizing the region to the mid-resolution size;
extracting one or more features for each region of the plurality regions; and
combining the one or more features from each of the regions to form the one or more features extracted from the context region.

2. The non-transitory computer-readable medium or media of claim 1 wherein the multi-scale feature further comprises:
a perspective feature descriptor comprising at least one of an indicator of a location of the image patch in the image and an indicator of a size of the image patch.

3. The non-transitory computer-readable medium or media of claim 1 wherein generating a context region for the image patch comprising at least a portion of the image comprises:
selecting a portion or portions of the image that are within a context region area defined by a size that is relative to the size of the image patch and by a position relative to the image patch.

4. The non-transitory computer-readable medium or media of claim 3 wherein:
the image patch is centered within the context region; and
the area of the context region, including the image patch, is four times the size of the area of the image patch.

5. The non-transitory computer-readable medium or media of claim 3 wherein:
responsive to a portion of the context region being outside a boundary of the image, filling the portion of the context region that is outside the boundary of the image with one or more values.

6. The non-transitory computer-readable medium or media of claim 1 wherein the plurality of regions comprises three regions of equal size.

7. A processor-based system for detecting an object in an image, the system comprising:
an image patch generator for receiving an input image and for generating an image patch from the input image that may contain the object and a context region for the image patch;
a feature generator, communicatively coupled to receive the image patch, for generating a multi-scale feature comprising at least two of:
a high-scale feature comprising one or more features extracted from the image patch at a high-resolution size;
a mid-scale feature comprising a combination of one or more features extracted from the image patch at a mid-resolution size and one or more features extracted from a set of one or more regions at the mid-resolution size, the set of one or more regions being formed from the context region; and
a low-scale feature comprises one or more features extracted from a combined image patch at a low-resolution size, the combined image patch comprising the image patch and the context region; and
a detector, communicatively coupled to receive the multi-scale feature for the image patch, for using a trained classifier corresponding to multi-scale feature to provide a score related to whether to image patch contains the object;
wherein the generating of the combination of one or more features extracted from the image patch at a mid-resolution size includes:
dividing the context region into a plurality of regions;
for each region from the plurality of regions that does not have the mid-resolution size, re-sizing the region to the mid-resolution size;
extracting one or more features for each region of the plurality of regions; and
combining the one or more features from each of the regions to form the combination of one or more features extracted from the context region.

8. The processor-based system of claim 7 wherein the feature generator further comprises:
a perspective feature generator, communicatively coupled to receive information regarding the image patch, for generating a perspective feature for the image patch comprising at least one of a size feature and a position feature.

9. The processor-based system of claim 7 wherein the image patch generates the context region by performing the steps comprises:
selecting a portion or portions of the image that are within a context region area defined by a size that is relative to the size of the image patch and by a position relative to the image patch; and
responsive to a portion of the context region being outside a boundary of the image, filling the portion of the context region that is outside the boundary of the image with one or more values.

10. The processor-based system of claim 7 further comprising:
a classifier trainer, communicatively coupled to receive one or more features from the feature generator and communicatively coupled to receive image labels of image patches indicating whether the image patch contains the object, for training one or more classifiers corresponding to the one or more features received from the feature generator.

11. The processor-based system of claim 7 wherein the detector uses a feature selected from the high-scale feature, the mid-scale feature, and the low-scale feature for detecting, wherein the feature is selected as being most closely related to the size of the image patch.

12. A non-transitory computer-readable medium or media comprising one or more sequences of instructions which, when executed by one or more processors, causes steps to be performed comprising:
for each image window from a set of one or more image windows from the image, defining a context region for the image window by selecting a portion or portions of the image that are within a context region area defined relative to the image window; and for each image window from the set of one or more image windows, constructing a multi-scale feature descriptor comprising a combination of a high-scale feature, a middle-scale feature, and a low-scale feature, wherein:

the high-scale feature comprises one or more features extracted from the image window at a first resolution;

the middle-scale feature comprises a combination of one or more features extracted from the image window at a second resolution and one or more features extracted from a set of one or more regions at the second resolution, the set of one or more regions being formed from the context region; and the low-scale feature comprises one or more features extracted from a combined image window having a third resolution, the combined image window comprising the image window and the context region;

wherein the step of forming the combination of one or more features extracted from a set of one or more regions at the second resolution comprises:

dividing the context region into a plurality of regions;

for each region from the plurality of regions that does not have the second resolution size, re-sizing region to the re the second resolution size;

extracting one or more features for each region of the plurality of regions; and combining the one or more features from each of the regions to form the combination of one or more features extracted from the context region.

13. The non-transitory computer-readable medium or media of claim 12 wherein the multi-scale feature descriptor further comprises:

a perspective feature descriptor comprising an indicator of a location of the image patch in the image and an indicator of a size of the image window.

14. The non-transitory computer-readable medium or media of claim 12 wherein the step of defining the context region comprises:

the image window is centered within the context region; and the context region area is a multiple of the area of the image window.

15. The non-transitory computer-readable medium or media of claim 12 wherein:

responsive to a portion of the context region being outside a boundary of the image, filling the portion of the context region that is outside the boundary of the image with one or more values.

\* \* \* \* \*